(12) United States Patent
Schütz

(10) Patent No.: US 7,134,360 B2
(45) Date of Patent: Nov. 14, 2006

(54) VEHICLE STEERING WHEEL

(75) Inventor: Dominik Schütz, Waldaschaff (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 54 days.

(21) Appl. No.: 10/264,245

(22) Filed: Oct. 3, 2002

(65) Prior Publication Data

US 2003/0066378 A1 Apr. 10, 2003

(30) Foreign Application Priority Data

Oct. 5, 2001 (DE) ................................ 201 16 306

(51) Int. Cl.
*B62D 1/04* (2006.01)
*H01H 9/00* (2006.01)
*B60R 21/16* (2006.01)

(52) U.S. Cl. ...................... 74/552; 200/61.54; 280/731

(58) Field of Classification Search ................. 74/552, 74/484 R, 492; 280/731; 200/61.54, 61.55; 318/489
See application file for complete search history.

(56) References Cited

U.S. PATENT DOCUMENTS

| | | | | |
|---|---|---|---|---|
| 4,729,254 A | * | 3/1988 | Nogami et al. | 74/484 R |
| 5,508,482 A | * | 4/1996 | Martin et al. | 200/61.55 |
| 5,569,893 A | * | 10/1996 | Seymour | 280/731 |
| 5,756,950 A | * | 5/1998 | De Filippo | 200/61.54 |
| 6,153,996 A | * | 11/2000 | Nigrin et al. | 318/489 |
| 6,183,005 B1 | | 2/2001 | Nishijima et al. | |
| 6,299,201 B1 | * | 10/2001 | Fujita | 280/731 |
| 6,349,616 B1 | * | 2/2002 | Onodera et al. | 74/552 |
| 6,426,473 B1 | * | 7/2002 | Derrick et al. | 200/61.54 |
| 6,437,265 B1 | * | 8/2002 | Kreuzer | 74/552 |
| 6,453,769 B1 | * | 9/2002 | Sakurai | 74/552 |
| 6,545,236 B1 | * | 4/2003 | Valk et al. | 200/61.54 |
| 6,639,160 B1 | * | 10/2003 | Ibe et al. | 200/61.54 |
| 6,849,816 B1 | * | 2/2005 | Rumpf | 200/61.54 |
| 6,852,936 B1 | * | 2/2005 | Hayashi et al. | 200/61.54 |
| 6,941,836 B1 | * | 9/2005 | Umemura et al. | 74/552 |
| 2001/0052694 A1 | * | 12/2001 | Schutz | 280/731 |
| 2002/0125698 A1 | | 9/2002 | Schutz | 74/552 |
| 2003/0061896 A1 | * | 4/2003 | Takai et al. | 74/473.12 |

FOREIGN PATENT DOCUMENTS

| | | | |
|---|---|---|---|
| DE | 19914653 C1 | 7/2000 | |
| DE | 199 56 872 A1 | * 6/2001 | 74/552 |
| DE | 20103890 | 8/2001 | |
| EP | 1 088 737 A2 | * 4/2001 | |

* cited by examiner

*Primary Examiner*—Vinh T. Luong
(74) *Attorney, Agent, or Firm*—Tarolli, Sundheim, Covell & Tummino LLP

(57) ABSTRACT

A vehicle steering wheel comprises a hub and several switches The switches are integrated in a common housing which is secured to the hub.

7 Claims, 3 Drawing Sheets

VEHICLE STEERING WHEEL

TECHNICAL FIELD

The invention relates to a vehicle steering wheel.

BACKGROUND OF THE INVENTION

A steering wheel normally includes a hub and several switches. The switches enable the vehicle driver to operate e.g. the gear change, the radio or a telephone without having to take the hands off the steering wheel. Hitherto, a separate switch was provided fitted to the hub for each function to be switched. This complicates assembly. Apart from this a complicated system is needed to ensure precise location of the switches since otherwise an undesirable gap between adjacent components, for example a neighboring switch or a cover of the steering wheel, may materialize.

The object of the invention is to further develop a steering wheel of the aforementioned kind so that assembly and production complications are reduced.

BRIEF SUMMARY OF THE INVENTION

According to the invention, a vehicle steering wheel comprises a hub and several switches The switches are integrated in a common housing which is secured to the hub. This results in only a single housing needing to be produced for the plurality of switches and then fitted to the steering wheel. This is cost-saving. Apart from this the various switches are now precisely positioned relative to each other so that no undesirable gap can materialize between the individual switches.

In accordance with the preferred embodiment an air bag module is provided which has a cover, and the housing comprises at least one mount cooperating with the cover. This results in particularly precise positioning of the cover for the air bag module relative to the switches so that no undesirable gap can materialize between the individual switches and the cover.

Preferably the mount is formed by a mounting peg engaging an opening of the cover. This results in the cover being movable relative to the switches which are fixedly secured to the steering wheel, so that they can be pressed, for example, to actuate a signal horn switch.

It is preferably provided for that the housing surrounds the air bag module at least in part. This enables the switches to be arranged to advantage in the portions surrounding the air bag module available between the rim of the steering wheel and the air bag module so that a particularly compact design materializes.

Preferably a common plug is used for connecting the switches. This plug can be fitted at a suitable location either directly on the housing or at the end of a cable ported into the housing. All switches can now be connected with minimum complication simply by inserting this sole plug into a complementary connector socket.

Preferably the function of at least one of the switches is freely programmable in thus enabling a standardized housing to be used with the various switches for different variants of the vehicle or vehicle fittings.

In accordance with the preferred embodiment of the invention it is provided for that one of the switches serves to activate a hazard warning flasher. This switch is provided in a central position for optimum accessibility so that the hazard warning flasher can be activated, if required, without delay and without having to take the hands off the steering wheel. In addition, it may be provided for that the hazard warning flasher is activated automatically and electromechanically on activation of the air bag module or by the activation electronics of the air bag module.

Advantageous aspects of the invention will be apparent from the sub-claims.

DETAILED DESCRIPTION OF THE PREFERRED EMBODIMENT

Figure 1:
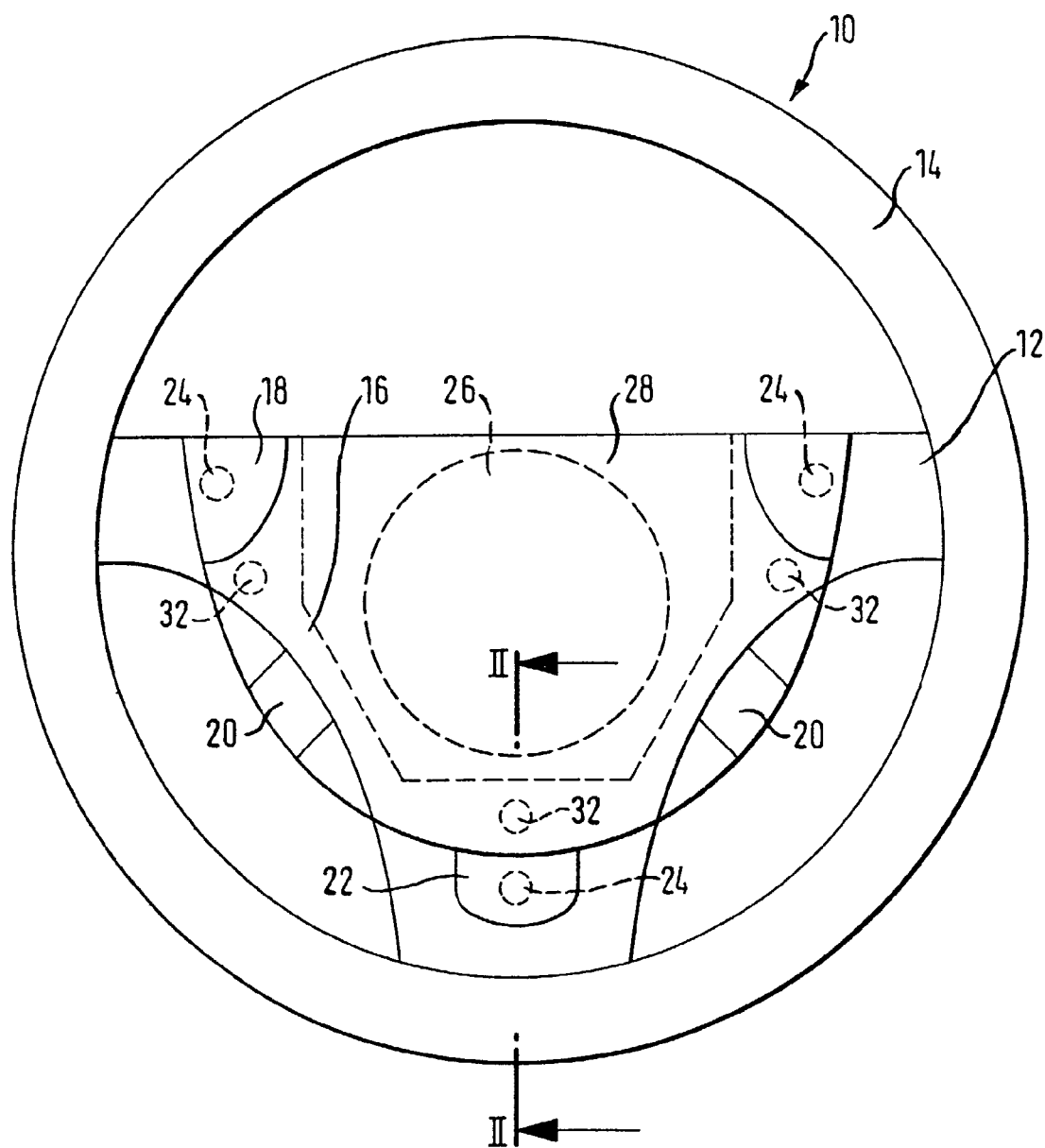
FIG. 1 is a diagrammatic plan view of a steering wheel in accordance with the invention.
Figure 2:
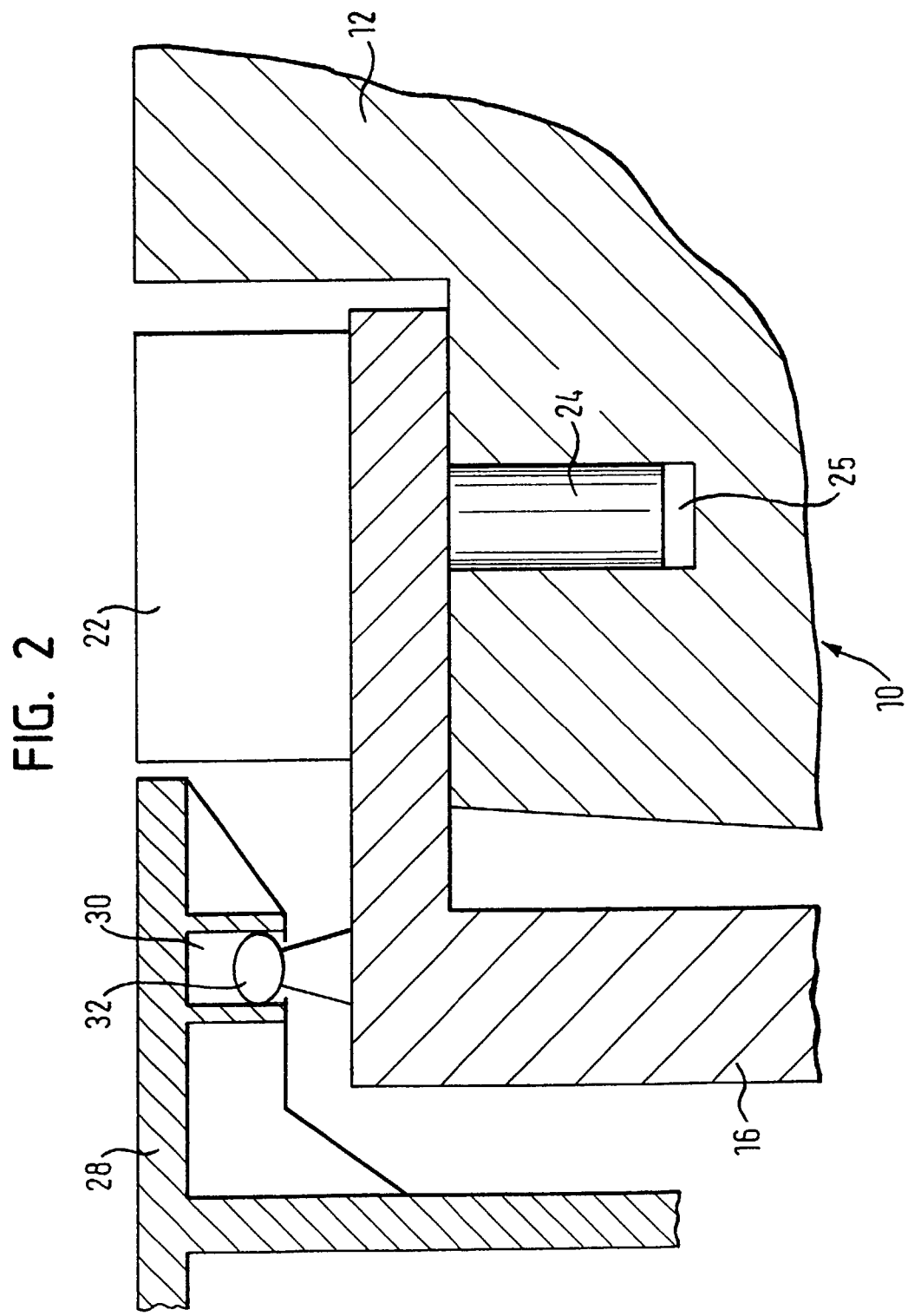
FIG. 2 is a diagrammatic sectional view taken along the plane II—II as shown in FIG. 1.
Figure 3:
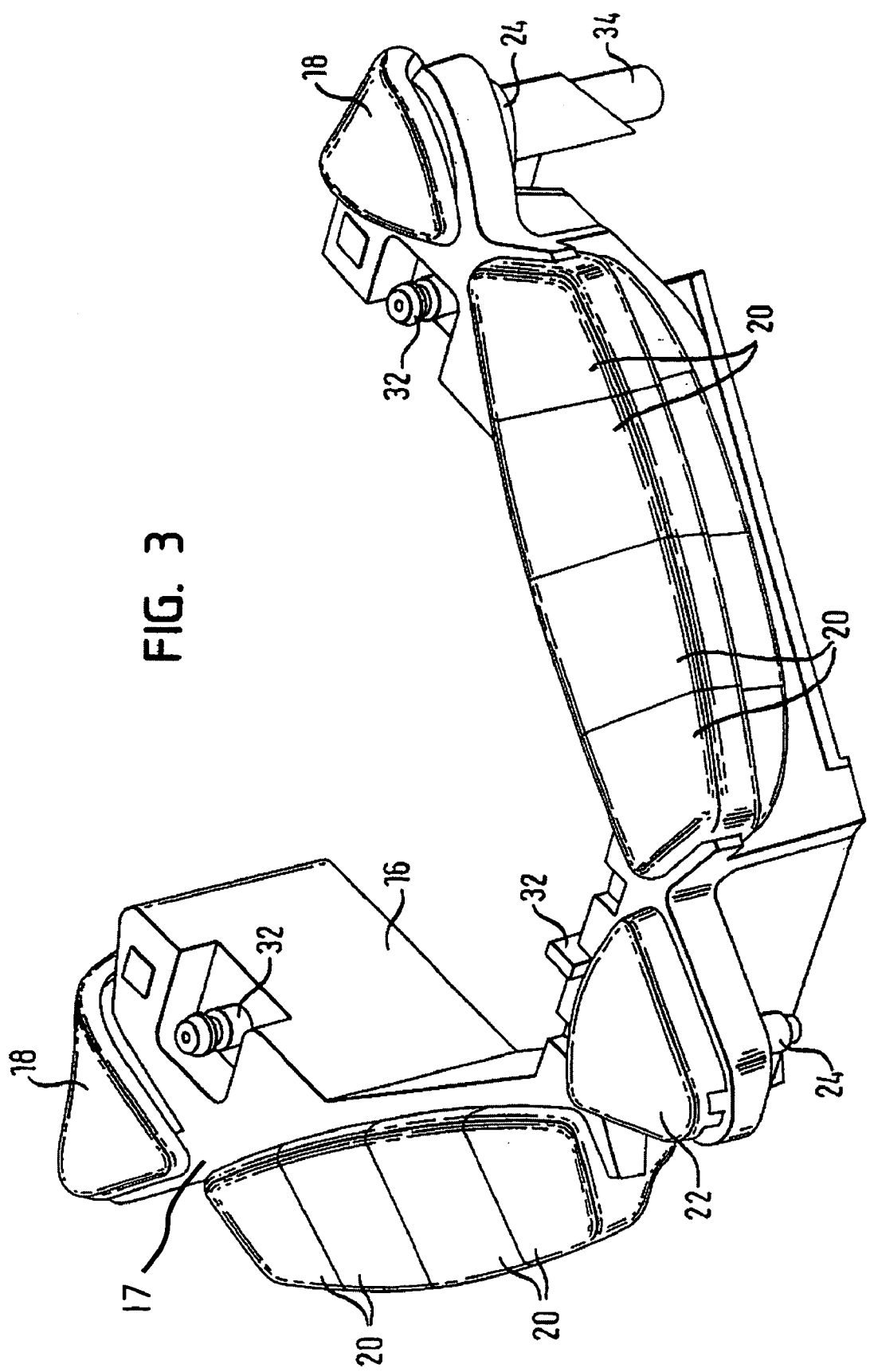
FIG. 3 is a view in perspective of a housing including switches as used on the steering wheel as shown in FIG. 1.

Referring now to FIG. 1 there is illustrated a vehicle steering wheel 10 comprising a hub 12 and a rim 14. Attached to the hub 12 is a housing 16 (see also FIGS. 2 and 3) in which several switches 18, 20, 22 are accommodated. Each of the switches 18. 20, 22 engages an upper surface 17 of the housing 16. The housing 16 is provided, for the purpose of being fitted to or positioned on the hub 12, with several locating pegs 24 engaging corresponding holes 24 in the hub.

The housing 16 is configured U-shaped (see FIG. 3) in general, i.e. it surrounding a center space by approximately 180°. Mounted in this center space is an air bag module 26 indicated diagrammatically. On the side of the air bag module 26 facing the vehicle driver, a cover 28 is mounted forming a more or less flush finish with the switches 18, 20, 22, to ensure enhanced visual appeal as a whole.

For fitting or positioning the cover 28 it is provided with several openings 30, each of which is engaged by a mounting peg 32 fitted to the housing 16. The mounting peg 32 together with the openings 30 enable the cover 28 to be depressed in a direction parallel to the axis of rotation of the steering wheel for actuating the signal horn, for example.

In this configuration, the housing 16 together with the locating pegs 24 which cooperate with the hub 12, and with the mounting pegs 32 which cooperate with the cover, simultaneously serves to locate and guide the cover 28 relative to the partly adjoining hub 12.

Since the cover 28 is directly fitted to the housing 16 of the switches, the gaps between the cover and the switches are minimized, despite the cover being shiftable. Similar minimized gaps result between the switches and the hub of the steering wheel, since the housing of the switches is securely fitted to or positioned on the hub.

Circuit boards and other connecting elements for the various switches 18, 20, 22 may be arranged in the housing 16, including also electronics components, so that the function of the switches can be freely programmed. For this purpose a programming terminal 34 is provided which is accessible from the rear in the fitted steering wheel. In this way it is possible to provide for an individual, customized switch circuiting for one and the same vehicle type. Only a sole plug is provided for connecting all switches by it being simply inserted in a complementary connector socket on assembly of the vehicle steering wheel.

In accordance with an alternative embodiment (not shown) it may be provided for that several switches are mounted on the air bag module 26 instead of on the hub. The advantages afforded by this arrangement are essentially the same as those as already described for the arrangement in being fitted to the hub.

The invention claimed is:

1. An apparatus comprising:
   a rotatable vehicle steering wheel having a hub member rotatable with the steering wheel;
   an air bag module including a cover mounted on said steering wheel;
   a housing supporting a plurality of electrical switches, said housing being spaced apart from said cover, said housing being secured to, mounted on, and supported by said hub member, wherein each of said switches engages an upper surface of the housing; and
   members extending from said housing into openings in said hub member spaced apart from the cover to locate said housing relative to said hub member.

2. The apparatus as set forth in claim 1 further including a plurality of mounts extending from said housing that engage openings in said cover to enable the cover to be depressed in a direction parallel to the axis of rotation of the steering wheel.

3. he apparatus as set forth in claim 2 wherein said mounts extend upwardly with respect to said steering wheel.

4. he apparatus as set forth in claim 1 wherein said members extend downwardly from said housing.

5. An apparatus comprising:
   a rotatable vehicle steering wheel having a hub member rotatable with the steering wheel;
   an air bag module including a cover mounted on said steering wheel; and
   a housing supporting a plurality of electrical switches, said housing being spaced apart from said cover, said housing being secured to, mounted on, and supported by said hub member, wherein each of said switches engages an upper surface of the housing, said housing comprising at least one mount cooperating with said cover, wherein said mount is formed by a mounting peg engaging an opening of said cover.

6. An apparatus comprising:
   a rotatable vehicle steering wheel having a hub member rotatable with the steering wheel;
   an air bag module including a cover mounted on said steering wheel; and
   a housing supporting a plurality of electrical switches, said housing being spaced apart from said cover, said housing being secured to, mounted on, and supported by said hub member, wherein each of said switches engages an upper surface of the housing, wherein a plug is provided, all of said switches being connected to said plug.

7. An apparatus comprising:
   a rotatable vehicle steering wheel having a hub member rotatable with the steering wheel;
   an air bag module including a cover mounted on said steering wheel; and
   a housing supporting a plurality of electrical switches, said housing being spaced apart from said cover, said housing being secured to, mounted on, and supported by said hub member, wherein each of said switches engages an upper surface of the housing, wherein said cover is positioned flush with said electrical switches when said electrical switches are not actuated.

* * * * *

UNITED STATES PATENT AND TRADEMARK OFFICE
CERTIFICATE OF CORRECTION

| | | |
|---|---|---|
| PATENT NO. | : 7,134,360 B2 | Page 1 of 1 |
| APPLICATION NO. | : 10/264245 | |
| DATED | : November 14, 2006 | |
| INVENTOR(S) | : Dominik Schutz | |

It is certified that error appears in the above-identified patent and that said Letters Patent is hereby corrected as shown below:

Column 3, line 23, before "apparatus" delete "he" and insert --The--.
Column 3, line 25, before "apparatus" delete "he" and insert --The--.

Signed and Sealed this

Twenty-fourth Day of April, 2007

JON W. DUDAS
*Director of the United States Patent and Trademark Office*